United States Patent [19]
Jurik et al.

[11] Patent Number: 5,704,642
[45] Date of Patent: Jan. 6, 1998

[54] LOWER BEARING ASSEMBLY INCLUDING SPRING RETAINING RING FOR AN AUTOMOTIVE STEERING SHAFT

[75] Inventors: Mirjana Jurik, Rochester Hills; Thomas Grzybowski, Fraser, both of Mich.

[73] Assignee: Chrysler Corporation, Auburn Hills, Mich.

[21] Appl. No.: 668,799

[22] Filed: Jun. 24, 1996

[51] Int. Cl.⁶ .................................................. B62D 1/16
[52] U.S. Cl. .................................................. 280/779
[58] Field of Search .................................. 280/779, 780

[56] References Cited

U.S. PATENT DOCUMENTS

| | | | |
|---|---|---|---|
| 2,961,891 | 11/1960 | Sewelin | 280/779 |
| 4,509,775 | 4/1985 | Arndt | 280/779 |
| 4,895,391 | 1/1990 | Groat | 280/779 |
| 5,088,768 | 2/1992 | Maruyama et al. | 280/779 |
| 5,320,384 | 6/1994 | Arnold et al. | 280/779 |

*Primary Examiner*—Kenneth R. Rice
*Attorney, Agent, or Firm*—Lawrence J. Shurupoff

[57] ABSTRACT

A lower bearing assembly for supporting a steering shaft within a tubular jacket of an automotive steering column. The steering shaft is of double-D configuration having two diametrically opposite, arcuate side walls and two diametrically opposite parallel flats. A cup is fitted within the jacket having a hole in the bottom wall through which the steering shaft extends. A bearing within the cup supports the steering shaft for rotation. A wedge tube is sleeved on the steering shaft and has a tapered nose wedged between the bearing and the steering shaft. A compression coil spring encircles the wedge tube and bears on a flange on the wedge tube to hold the nose of the wedge tube wedged tightly between the bearing and the steering shaft. A retaining ring is sleeved on the steering shaft and holds the spring under compression. The inner edge of the retaining ring has the same double-D configuration as the steering shaft.

7 Claims, 3 Drawing Sheets

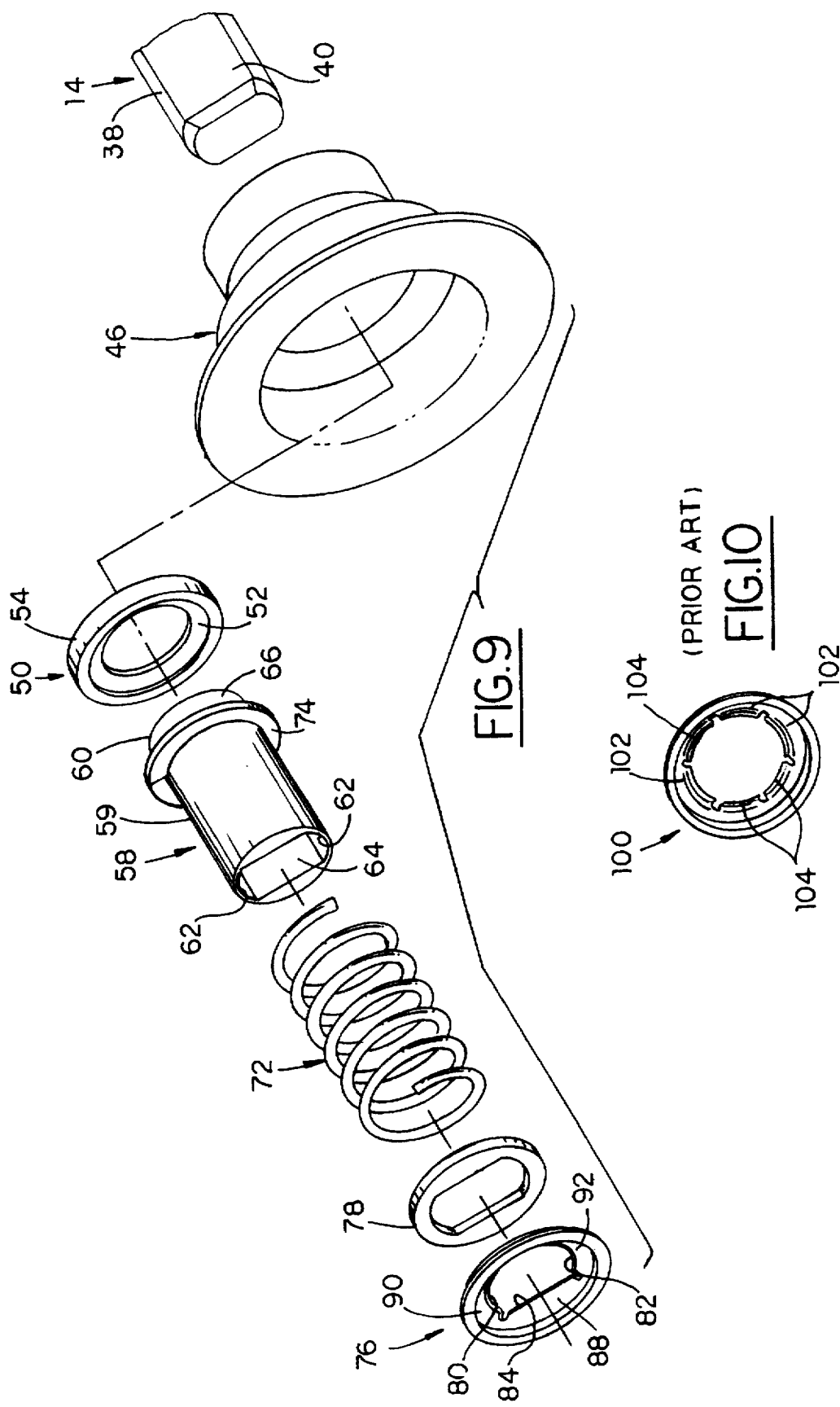

5,704,642

LOWER BEARING ASSEMBLY INCLUDING SPRING RETAINING RING FOR AN AUTOMOTIVE STEERING SHAFT

FIELD OF INVENTION

This invention relates generally to steering column assemblies for motor vehicles and more particularly to a lower bearing assembly including a retaining ring for supporting a double-D steering shaft within the jacket of the steering column.

BACKGROUND AND SUMMARY OF THE INVENTION

In a steering column of an automotive vehicle, a lower bearing assembly supports the steering shaft for rotation. In the case of cylindrical steering shafts, a spring is provided to keep the load on the bearing and the spring is backed by a spring retaining ring. The spring retaining ring is typically circular. However, in the case of the so-called double-D steering shaft, the standard circular spring retaining ring has not worked satisfactorily.

In accordance with the present invention, the retaining ring has an inner configuration which matches that of the double-D steering shaft. It is formed with two diametrically opposite, arcuate side edges to frictionally engage the arcuate side walls of the steering shaft. The retaining ring is also formed with two diametrically opposite, parallel, straight edges which frictionally engage the two flat sides of the steering shaft. Preferably, the retaining ring has an annular base formed with two diametrically opposite, arcuate flanges bent to an acute angle relative to the base and terminating in the arcuate side edges which engage the curved sides of the steering shaft. The base is otherwise flat between the flanges and terminates in the straight edges which engage the flat sides of the steering shaft.

More particularly, and in accordance with a preferred embodiment of the invention, the steering shaft extends through a cup in the jacket surrounding the steering shaft and an annular bearing sleeved on the steering shaft at the base of the cup supports the steering shaft for rotation. The bearing is held seated in the base of the cup by a wedge tube sleeved on the steering shaft having a tapered nose wedged between the bearing and the steering shaft. A compression coil spring encircling the wedge tube bears against a flange on the wedge tube to hold the nose of the wedge tube wedged tightly between the bearing and the steering shaft. The retaining ring is sleeved on the steering shaft and holds the spring under compression. The construction also preferably includes a spacer between the wedge tube and the retaining ring, the retaining ring bearing against the spacer and the spacer bearing against the spring.

One object of this invention is to provide a lower bearing assembly with a retaining ring especially designed for use with a double-D steering shaft, having the foregoing features and capabilities.

Another object is to provide a lower bearing assembly including a specially formed retaining ring, the parts of the bearing assembly including the retaining ring being rugged and durable in use and capable of being readily and inexpensively manufactured and assembled.

These and other objects, features and advantages of the invention will become more apparent as the following description proceeds, especially when considered with the accompanying drawings.

BRIEF DESCRIPTION OF THE DRAWINGS

FIG. 3 is a further enlargement of a portion of FIG. 2.

FIG. 4 is a sectional view taken on the line 4—4 in FIG. 3.

FIG. 5 is a sectional view taken on the line 5—5 in FIG. 3.

FIG. 9 is an exploded view in perspective showing the parts of the lower bearing assembly.

FIG. 10 is a perspective view of a prior art retaining ring.

DETAILED DESCRIPTION OF THE PREFERRED EMBODIMENT

Figure 1:
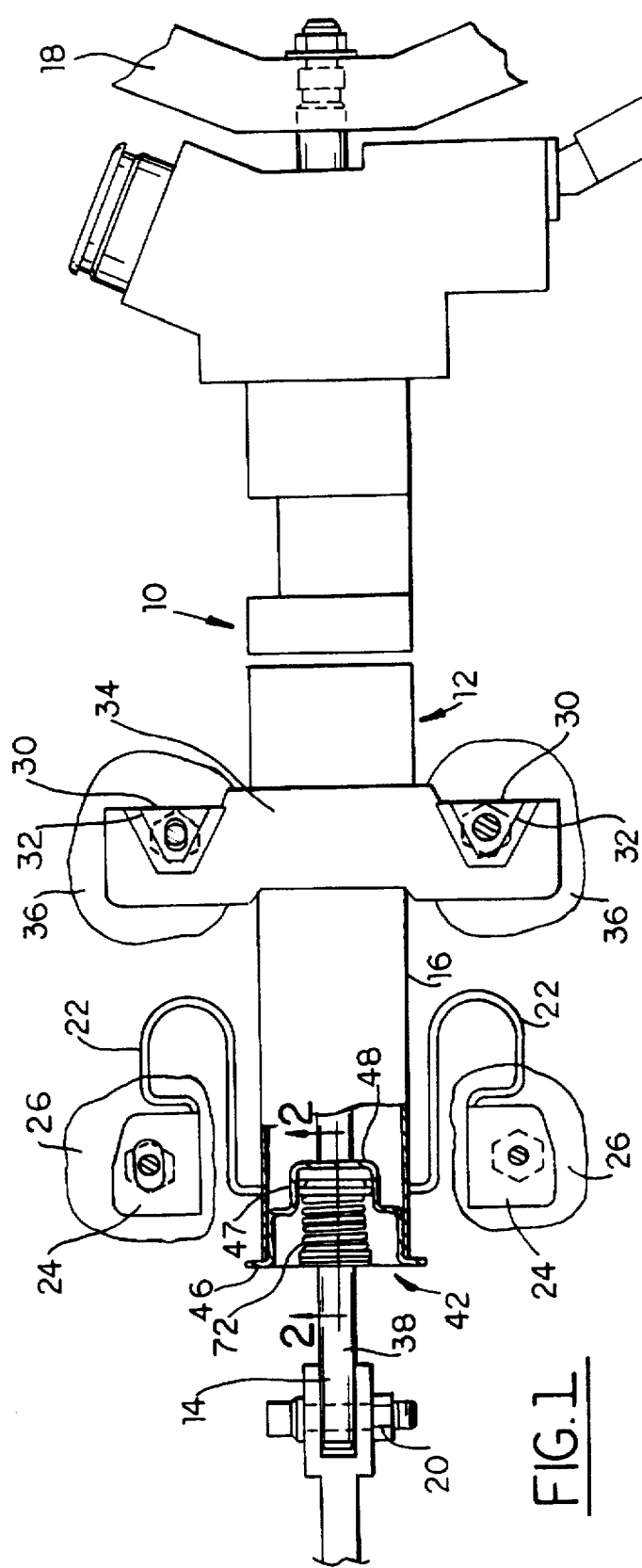
FIG. 1 is a plan view with parts broken away and in section, of a steering column and lower bearing assembly constructed in accordance with the invention.
Figure 2:
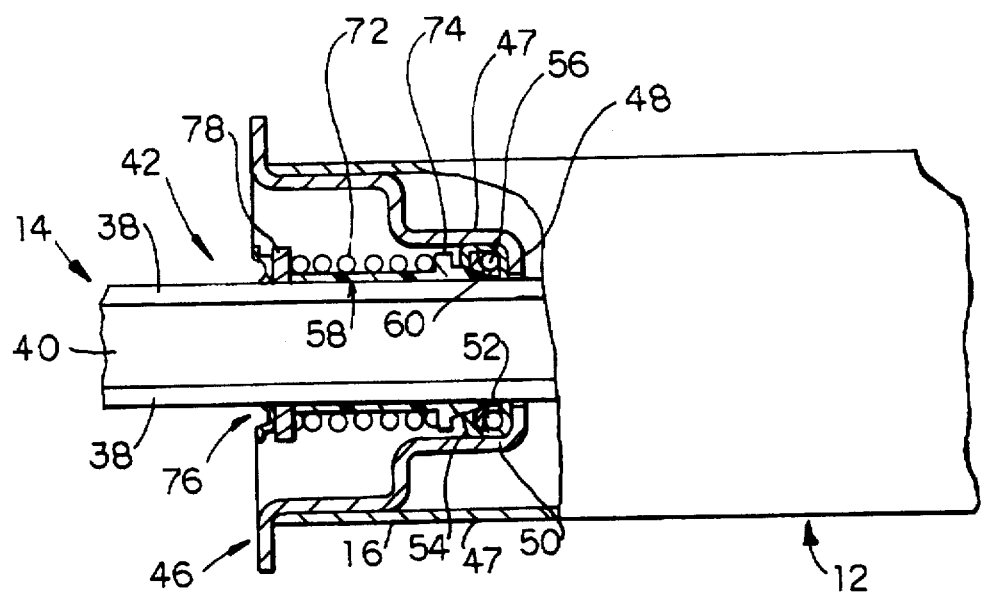
FIG. 2 is an enlarged view partly in section and partly in elevation of a portion of the structure of FIG. 1, the part in section being taken on the line 2—2 in FIG. 1.

Referring now more particularly to the drawing, a steering column assembly 10 is shown comprising an elongated downwardly and forwardly inclined steering column 12 having an elongated tubular jacket 16. A steering wheel 18 is mounted on the upper end of the steering shaft. A shaft coupler 20 on the lower end of the steering shaft is operatively connected to a steering gear assembly (not shown) to steer the front wheels of an automotive vehicle.

Resilient spring-like straps 22 attached at one end to brackets 24 which are in turn mounted on rigid vehicle support structure 26, are connected at their opposite ends to the jacket 16 of the steering column and are provided to absorb energy in the event of a frontal impact resulting in collapse of the steering column when the driver is thrown forward against the steering wheel. Vibration is suppressed by quick release capsules 30 mounted in grooves 32 of bracket 34 on opposite sides of the steering column, the brackets being secured to vehicle support structure 36. These capsules are capable of quickly releasing so as not to interfere with the collapse of the steering column.

The steering shaft 14, throughout its length, is of a uniform double-D configuration, having two diametrically opposite sides 38 curved to the same radius, and two parallel, diametrically opposite, flat or planar surfaces 40, sometimes referred to hereinafter as flats, between the arcuately curved sides 38.

A lower bearing assembly 42 supports the steering shaft 14 for axial rotation. The lower bearing assembly comprises a cup 46 which is secured in the lower end of the jacket 16 by having its side wall 47 press fitted in and/or welded or otherwise secured to the jacket. The cup opens in a direction facing the coupler 20 and has a hole in its bottom wall 48 through which the steering shaft extends. The hole is large enough to clear the steering shaft and allow it to rotate freely.

An annular bearing 50 is seated in the cup 46 against the bottom wall 48. The bearing has inner and outer ring-shaped races 52 and 54 surrounding the steering shaft which are arcuate in cross-section and contain a series of balls 56 therebetween.

A wedge tube 58 is sleeved on the shaft within the cup and has a tapered nose 60 at the end adjacent to the bearing. The wedge tube is formed of any suitable material, preferably plastic, such, for example, as urethane. The inner configuration of the wedge tube 58 is like that of the steering shaft, that is, it has the diametrically opposite arcuately curved sides 62 and also the diametrically opposite flats 64 (FIGS. 5 and 9). The wedge tube 58 closely envelops the steering shaft so that it rotates with the steering shaft but can slide lengthwise along the steering shaft. The wedge tube 58 may be transversely split where indicated at 59 so that it can be expanded slightly when fitted on the steering shaft.

The nose 60 of the wedge tube is tapered by having its frusto-conical radially outer surface 66 inclined or tapered toward its radially inner surface. The tapered nose is wedged between the inner race 52 of the bearing and the steering shaft and presses the outer race 54 of the bearing against the inner side wall 47 and bottom wall 48 of the cup.

Figure 6:
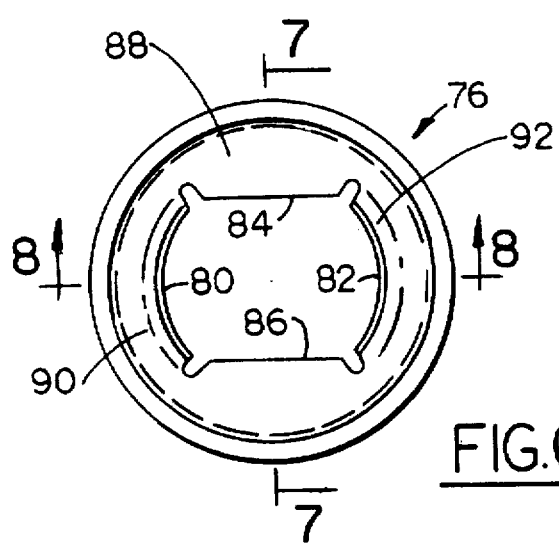
FIG. 6 is an elevational view of the retaining ring which is part of the lower bearing assembly.
Figure 7:
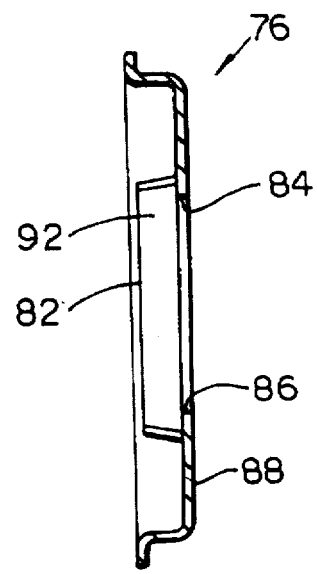
FIG. 7 is a sectional view taken on the line 7—7 in FIG. 6.
Figure 8:
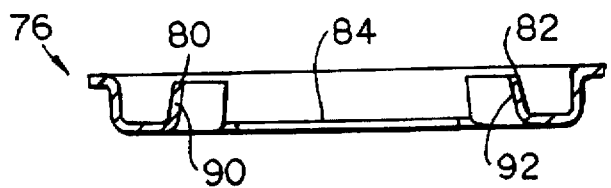
FIG. 8 is a sectional view taken on the line 8—8 in FIG. 6.

A compression coil spring 72 encircles the wedge tube 58. One end of the spring bears against a radially outwardly extending annular flange 74 on the wedge tube adjacent the nose 60. A retaining ring 76 (FIGS. 6–8) is sleeved on the steering shaft adjacent the opposite end of the spring, and a spacer 78 is sleeved on the steering shaft between the spring 72 and the retaining ring 76.

The retaining ring 76 has a radially inner double-D configuration of substantially the same size and shape as the steering shaft. It is formed with two diametrically opposite, arcuate side edges 80 and 82 of the same radius of curvature and spaced approximately the same distance apart as the arcuate side walls 38 of the steering shaft to frictionally engage the arcuate side walls. The inner configuration of the retaining ring also has two diametrically opposite, parallel, straight edges 84 and 86 spaced approximately the same distance apart as the flats 40 of the steering shaft to frictionally engage the flats 40. More specifically, the base 88 of the retaining ring is formed with two diametrically opposite, arcuate flanges 90 and 92 which are bent to an acute angle relative to the base in a direction away from the coil spring 72, terminating in the arcuate side edges 80 and 82. Between the flanges 90 and 92, the base is flat and terminates in the straight edges 84 and 86.

The inner edge of the spacer 78 is of the same double-D configuration as the steering shaft and is slidably sleeved on the steering shaft. The lower bearing assembly is put together by first installing the cup 46 in the jacket 16 and with the steering shaft extending through the hole in the bottom wall of the cup, after which the bearing 50 is placed around the steering shaft and seated against the bottom wall of the cup. Then the wedge tube 58 is slid onto the steering shaft and its nose 60 wedged between the inner race 52 of the bearing and the steering shaft. The spring is next installed around the wedge tube, after which the spacer 78 and retaining ring 76 are sleeved on the end of the steering shaft. The flanges 90 and 92 of the retaining ring are sufficiently flexible to provide a guide for the sleeving of the retaining ring on the steering shaft and preventing reverse sliding movement of the retaining ring because of the frictional locking action of the edges 80 and 82 of the flanges 90 and 92 on the side walls 38 of the steering shaft. The retaining ring is pressed up tight against the spacer 78 so that the spacer compresses the coil spring 72 and presses the nose 60 of the wedge tube 58 into a more tightly wedged relationship between the bearing 50 and the steering shaft. The spacer 78 also contacts the end of the wedge tube 58.

The retaining ring is also held against reverse movement by the frictional locking engagement of the straight edges 84 and 86 with the flats 40 of the steering shaft. The edges 84 and 86 are on a flat portion of the base, rather than on acute angle flanges, and have a powerful locking action on the steering shaft. The edges 80, 82, 84 and 86 actually bite into the surfaces 38 and 40 of the steering shaft to prevent the retaining ring from reverse movement away from the spring 72. The retaining ring 76 thus holds the lower bearing assembly tightly on the steering shaft without any noise or vibration.

FIG. 10 is a view of a prior art retaining ring 100 which has a series of arcuate, acute angle flanges 102 have inner edges 104 for gripping a cylindrical steering shaft, that is, one of circular cross-section. The retaining ring 100 does not perform well on the double-D steering shaft.

What is claimed is:

1. A lower bearing assembly for supporting a steering shaft within a tubular jacket of an automotive steering column wherein the steering shaft is of double-D configuration having two diametrically opposite, arcuate side walls formed with the same radius of curvature and two diametrically opposite, parallel flats between said side walls, comprising:

a cup fitted within the jacket having a bottom wall formed with a hole through which the steering shaft extends, an annular bearing within said cup sleeved on the steering shaft and supporting the steering shaft for rotation, means holding said bearing seated on the bottom wall of the cup comprising a compression spring applying axial pressure on the bearing, and a retaining ring sleeved on the steering shaft and holding the spring under compression, said retaining ring having a radially inner double-D configuration formed with two diametrically opposite, arcuate side edges of the same radius of curvature as the arcuate side walls of the steering shaft and frictionally engaging said arcuate side walls, and also formed with two diametrically opposite, parallel, straight edges frictionally engaging the flats of the steering shaft.

2. A lower bearing assembly as defined in claim 1, wherein said retaining ring has an annular radially extending base formed with two diametrically opposite, arcuate flanges bent to an acute angle relative to the base in a direction away from the spring and terminating in said arcuate side edges.

3. A lower bearing assembly as defined in claim 2, wherein said base is flat between said flanges and terminates in said straight edges.

4. A lower bearing assembly for supporting a steering shaft within a tubular jacket of an automotive steering column wherein the steering shaft is of double-D configuration having two diametrically opposite, arcuate side walls formed with the same radius of curvature and two diametrically opposite, parallel flats between said side walls, comprising:

a cup fitted within the jacket having a bottom wall formed with a hole through which the steering shaft extends, an annular bearing within said cup sleeved on the steering shaft and supporting the steering shaft for rotation, means holding said bearing seated on the bottom wall of the cup comprising a wedge tube sleeved on the steering shaft, said wedge tube having an inner double-D configuration matching that of the steering shaft and having a tapered nose wedged between said bearing and said steering shaft, said wedge tube having an annular radially outwardly extending flange adjacent said tapered nose, a compression coil spring encircling said wedge tube and bearing on said flange to hold the nose of said wedge tube held tightly between said bearing and said steering shaft, and a retaining ring sleeved on the steering shaft and holding the spring under compression, said retaining ring having a radially inner double-D configuration formed with two diametrically opposite, arcuate side edges of the same radius of curvature as the arcuate side walls of the steering shaft and frictionally engaging said arcuate side walls, and also formed with two diametrically opposite, parallel, straight edges frictionally engaging the flats of the steering shaft, said retaining ring having an annular radially extending base formed with two diametrically opposite, arcuate flanges bent to an acute angle relative to the base in a direction away from the spring and terminating in said arcuate side edges.

5. A lower bearing assembly as defined in claim 4, wherein said base is flat between said flanges and terminates in said straight edges.

6. A lower bearing assembly as defined in claim 5, and further including a spacer ring sleeved on the steering shaft between said wedge tube and said retainer ring, said retainer ring bearing against said spacer ring and said spacer ring bearing against said spring.

7. A lower bearing assembly as defined in claim 6, wherein the radially inner double-D configuration of said retaining ring is substantially the same as the double-D configuration of said steering shaft.

* * * * *